(12) United States Patent
Matsuura et al.

(10) Patent No.: US 8,496,287 B2
(45) Date of Patent: Jul. 30, 2013

(54) FRONT VEHICLE BODY STRUCTURE

(75) Inventors: Yuji Matsuura, Wako (JP); Shigeto Yasuhara, Wako (JP); Kojiro Okabe, Wako (JP); Ryota Abe, Wako (JP); Ken Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 124 days.

(21) Appl. No.: 13/242,817

(22) Filed: Sep. 23, 2011

(65) Prior Publication Data
US 2012/0086225 A1 Apr. 12, 2012

(30) Foreign Application Priority Data
Oct. 8, 2010 (JP) ................................ 2010-228873

(51) Int. Cl.
*B60R 19/34* (2006.01)
*B62D 25/08* (2006.01)

(52) U.S. Cl.
USPC ............ 296/187.09; 296/193.09; 296/203.02; 293/132; 293/133; 293/155

(58) Field of Classification Search
USPC ..................... 293/132, 133, 155; 296/187.09, 296/187.1, 193.09, 203.01, 203.02
See application file for complete search history.

(56) References Cited

U.S. PATENT DOCUMENTS

| | | | |
|---|---|---|---|
| 6,705,653 B2 * | 3/2004 | Gotanda et al. ............... | 293/132 |
| 7,533,913 B2 * | 5/2009 | Bae .............................. | 293/133 |
| 7,649,956 B2 * | 1/2010 | Noda et al. .................... | 375/279 |
| 8,002,338 B2 * | 8/2011 | Yasuhara et al. .......... | 296/203.02 |
| 8,020,907 B2 * | 9/2011 | Wibbeke et al. ............... | 293/133 |
| 8,215,705 B2 * | 7/2012 | Gonin ...................... | 296/187.09 |
| 8,235,433 B2 * | 8/2012 | Gonin .......................... | 293/120 |
| 8,256,831 B2 * | 9/2012 | Abe et al. ................ | 296/203.02 |
| 8,276,955 B2 * | 10/2012 | Baccouche et al. ........... | 293/133 |
| 8,308,207 B2 * | 11/2012 | Fang et al. .................... | 293/132 |
| 8,348,333 B2 * | 1/2013 | Iammarino et al. ...... | 296/187.09 |
| 2010/0259033 A1 * | 10/2010 | Okabe et al. ................. | 280/734 |
| 2012/0086225 A1 * | 4/2012 | Matsuura et al. ............. | 293/132 |
| 2012/0086275 A1 * | 4/2012 | Chatterjee ...................... | 307/52 |
| 2012/0248820 A1 * | 10/2012 | Yasui et al. .............. | 296/187.09 |

FOREIGN PATENT DOCUMENTS
JP 2010-125884 6/2010

* cited by examiner

*Primary Examiner* — Glenn Dayoan
*Assistant Examiner* — Gregory Blankenship
(74) *Attorney, Agent, or Firm* — Ditthavong Mori & Steiner, P.C.

(57) ABSTRACT

A front vehicle body structure includes, on each of left and right sides, a front side frame, an upper member, a frame connecting member, an impact absorbing mechanism. The impact absorbing mechanism has a closed cross-sectional shape in frontal view of a vehicle. The impact absorbing mechanism includes an external wall and an internal wall. The external wall is substantially straight with respect to an upper internal wall of the upper member such that the frame connecting member is disposed therebetween. The internal wall has a shape in which at least a front portion of the internal wall between a central portion of the internal wall in its longitudinal direction and the bumper beam is obliquely bent outward.

7 Claims, 9 Drawing Sheets

FRONT VEHICLE BODY STRUCTURE

CROSS-REFERENCE TO RELATED APPLICATIONS

The present application claims priority under 35 U.S.C. §119 to Japanese Patent Application No. 2010-228873, filed Oct. 8, 2010. The contents of this application are incorporated herein by reference in their entirety.

BACKGROUND OF THE INVENTION

1. Field of the Invention

The present invention relates to a front vehicle body structure.

2. Discussion of the Background

A front vehicle body structure can include an impact absorbing device between a bumper beam and a front body. Such a structure includes, on each of the left and right sides, a tubular impact absorbing mechanism disposed on a plate-like connecting member that connects the front edge of an upper member to the front end of a front side frame of a front body. If an impact occurring when the front of the vehicle comes into contact with an object is input at an angle, the tubular impact absorbing mechanism absorbs the impact without collapsing (see, for example, Japanese Unexamined Patent Application Publication No. 2010-125884).

SUMMARY OF THE INVENTION

According to one aspect of the present invention, a front vehicle body structure includes, on each of left and right sides, a front side frame, an upper member, a frame connecting member, an impact absorbing mechanism. The front side frame extends toward a rear of a vehicle from a lower front of the vehicle to a lower portion of a front pillar. The upper member extends from the lower front to a central portion of the front pillar outwardly with respect to the front side frame. The frame connecting member couples an upper front end of the upper member to a front-frame front end of the front side frame. The impact absorbing mechanism is coupled to the frame connecting member and coupled to an end of a bumper beam. The impact absorbing mechanism has a closed cross-sectional shape in frontal view of the vehicle. The impact absorbing mechanism includes an external wall and an internal wall. The external wall is substantially straight with respect to an upper internal wall of the upper member such that the frame connecting member is disposed therebetween. The internal wall has a shape in which at least a front portion of the internal wall between a central portion of the internal wall in its longitudinal direction and the bumper beam is obliquely bent outward.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
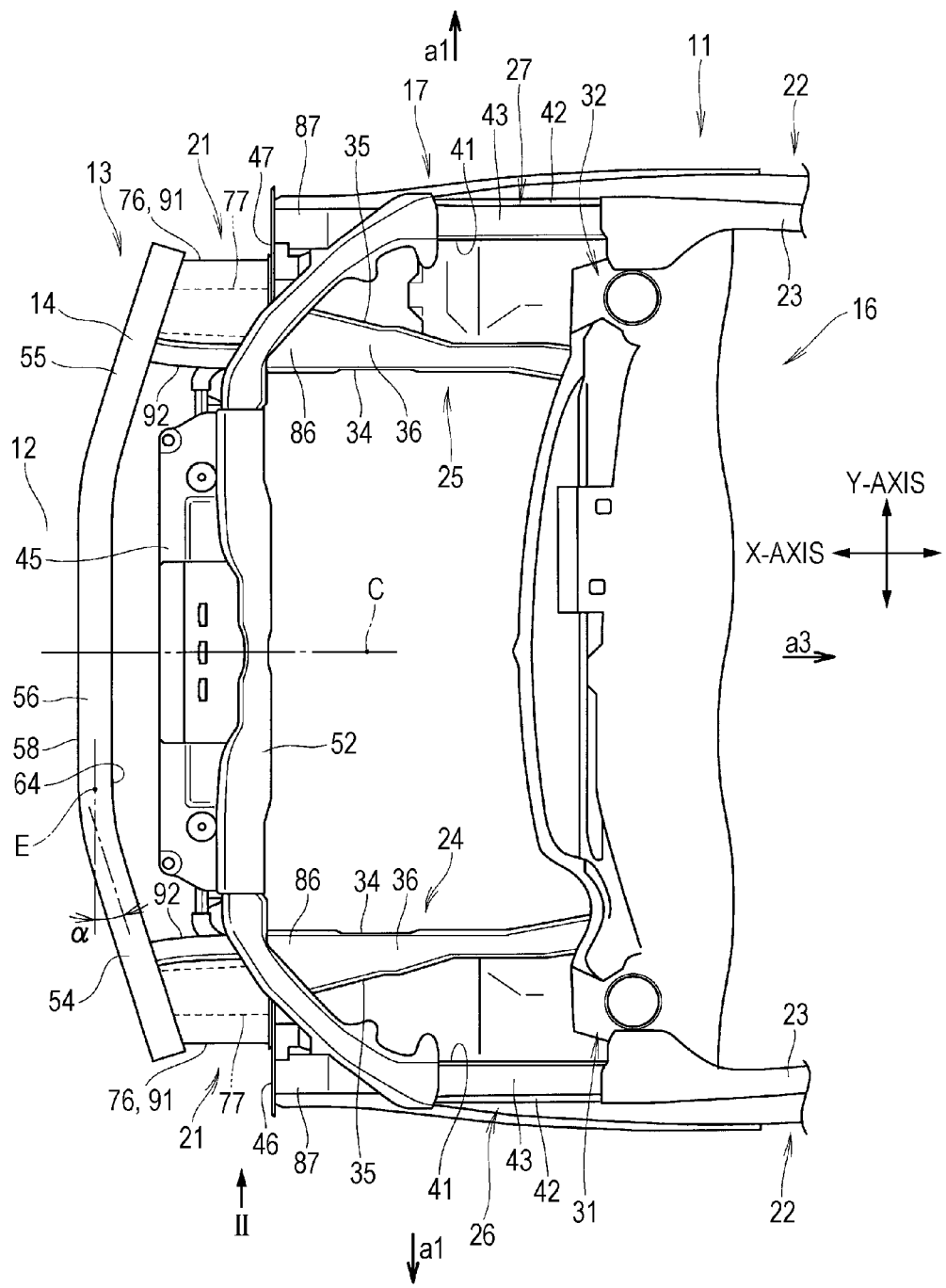
FIG. 1 is a plan view of a front vehicle body structure according to an example of the present invention.

The embodiments will now be described with reference to the accompanying drawings, wherein like reference numerals designate corresponding or identical elements throughout the various drawings.

Figure 2:
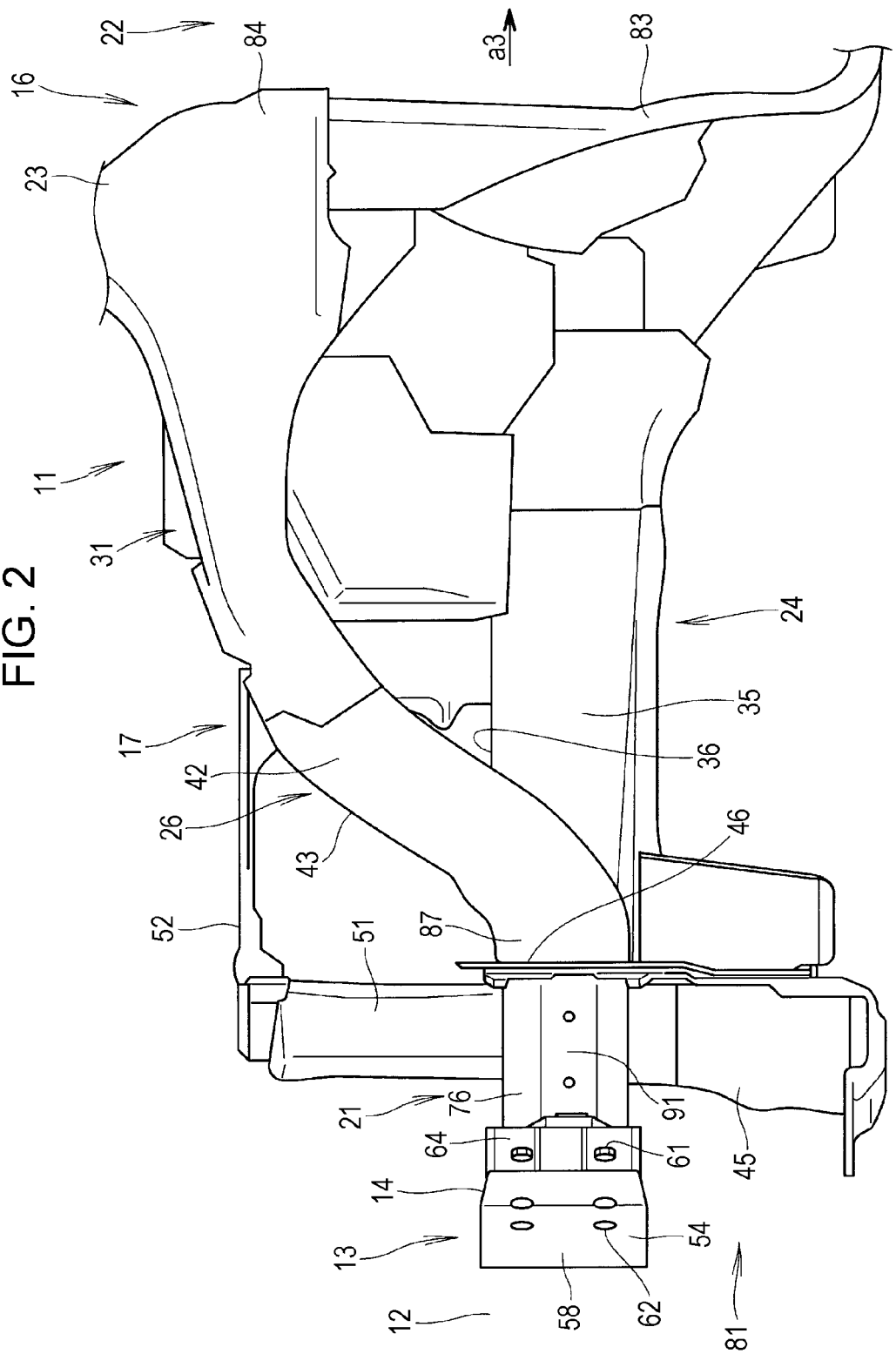
FIG. 2 is a view in the direction of arrow II in FIG. 1.
Figure 3:
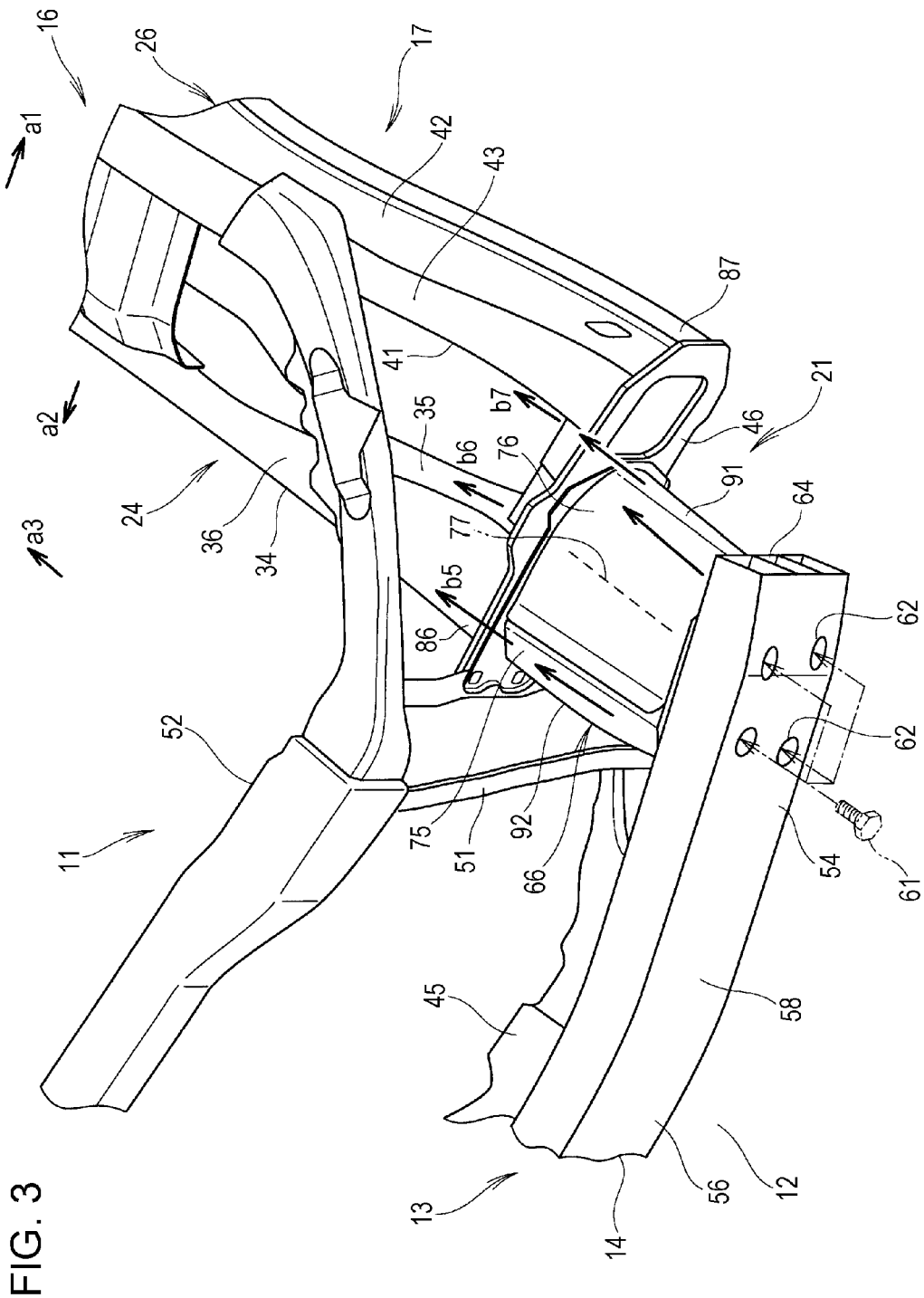
FIG. 3 is a perspective view that also serves as an operation diagram of the front vehicle body structure according to the example.

As illustrated in FIGS. 1 to 3, a front vehicle body structure according to an example supports a bumper beam 14 of a bumper 13 arranged at a front 12 of a vehicle 11. The bumper beam 14 is mounted on impact absorbing mechanisms 21 mounted at the left and right sides of a front body 17 of a vehicle body 16 of the vehicle 11.

The vehicle body 16 includes the front body 17 and left and right side bodies 22. Each of the side bodies 22 is provided with a front pillar 23.

The longitudinal direction of the vehicle 11 is the x-axis direction. In plan view of the vehicle 11 (view of FIG. 1), the central axis of the vehicle 11 in the width direction (y-axis direction) is indicated by C.

The front body 17 includes left and right front side frames 24 and 25, left and right upper members 26 and 27 disposed outwardly of the front side frames 24 and 25 (in the direction of arrow a1), and left and right dumper housings 31 and 32 coupled to the side frames 24 and 25 and the upper members 26 and 27.

Each of the front side frames 24 and 25 includes a front frame internal wall 34 facing the inside of the vehicle 11 (in the direction of arrow a2), a front frame external wall 35 facing the front frame internal wall 34, and a front frame top 36.

Each of the upper members 26 and 27 includes an upper internal wall 41 facing the inside of the vehicle 11 (in the direction of arrow a2), an upper external wall 42 facing the upper internal wall 41, and an upper top 43.

The front body 17 further includes a front cross member 45 coupling the left and right side frames 24 and 25 together, left and right frame connecting members 46 and 47 connecting the upper members 26 and 27 to the front side frames 24 and 25, left and right front side bulkheads 51 standing at the frame connecting members 46 and 47 and the front cross member 45, and a bulkhead upper frame 52 supporting the upper portion of the front side bulkheads 51 and connecting it to the upper members 26 and 27.

The bumper beam 14 is supported by the impact absorbing mechanisms 21.

The bumper beam 14 has a polygonal tubular shape. In plan view of the vehicle 11 (view of FIG. 1), the bumper beam 14 is curved such that both ends (left beam side section 54 and right beam side sections 55) are bent toward the rear of the vehicle 11 (the direction of arrow a3).

Specifically, the bumper beam 14 includes a substantially straight beam central section 56 and the substantially straight left and right beam side sections 54 and 55 being continuous with the beam central section 56. The sweep back angle of each of the beam side sections 54 and 55 is indicated by α.

Each of the beam side sections 54 and 55 includes a front wall 58 having tool holes 62 for allowing bolts 61 for mounting or other tools to pass therethrough.

Each of the beam side sections 54 and 55 also includes a rear wall 64 having holes (not illustrated) for allowing the bolts 61 to be fit therein, and the bolts 61 passing through these holes secures the rear wall 64 to the impact absorbing mechanism 21.

As illustrated in FIGS. 3 to 6, the impact absorbing mechanism 21 includes a tubular shock-absorbing member 66, a connecting front wall 68 mounted on a front edge 67 of the shock-absorbing member 66, and a coupling rear wall 72 mounted on a rear edge 71 of the shock-absorbing member 66.

The front edge 67 of the shock-absorbing member 66 matches with the sweep back angle α of the bumper beam 14 and is formed at the angle αb (αb=α).

The angle αb of the front edge 67 is the angle with respect to the line E perpendicular to the central axis C of the vehicle 11 in plan view of the vehicle.

The shock-absorbing member 66 is made of a steel sheet and includes an internal member 75, an external member 76, and a middle member (partition) 77.

Next, a main configuration of the front vehicle body structure is described with reference to FIGS. 1 to 7.

Figure 4:
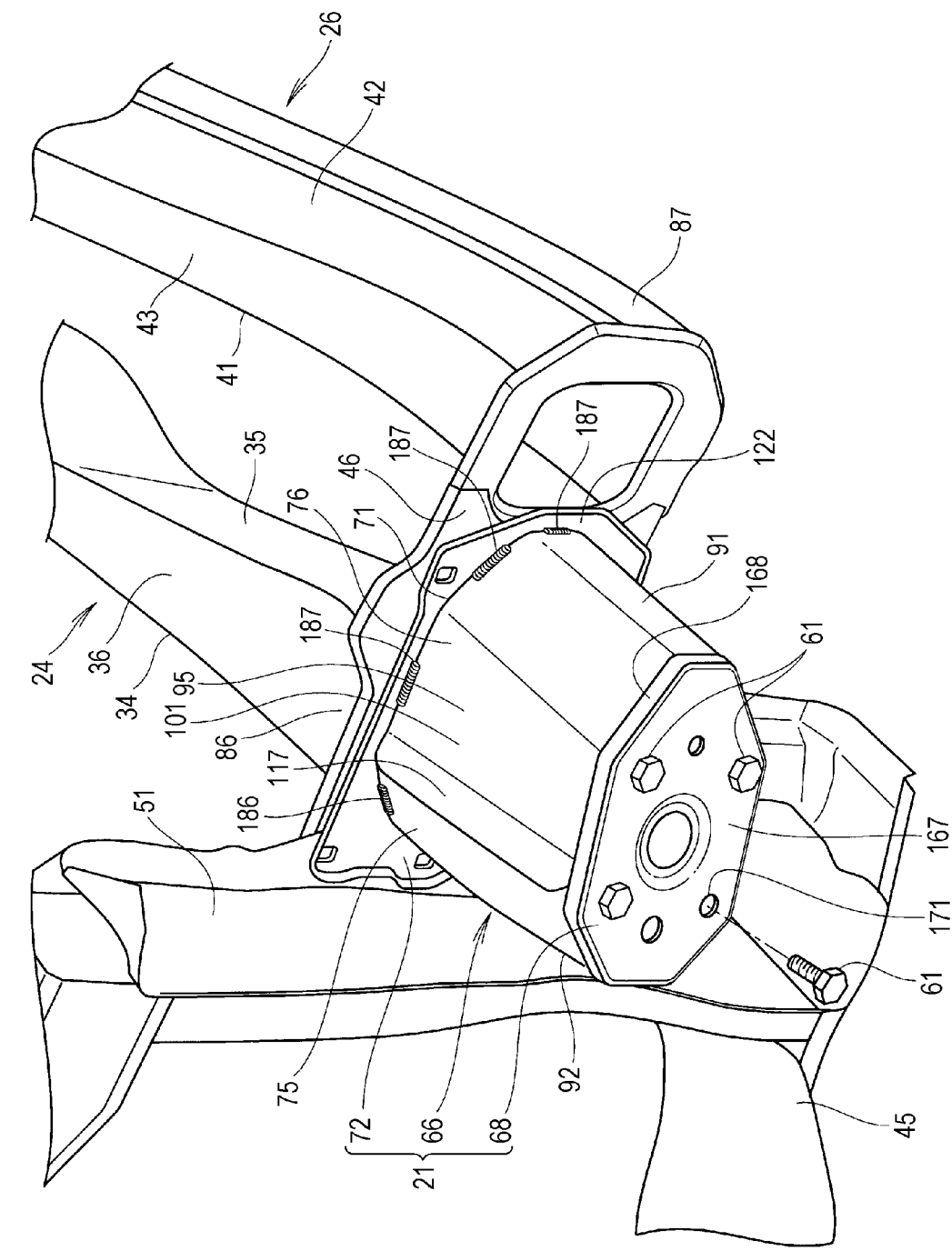
FIG. 4 is a perspective view of an impact absorbing mechanism according to the example.

FIG. 4 illustrates a state in which the bumper beam 14 is removed and the three bolts 61 are screwed into the connecting front wall 68.

For the front vehicle body structure, the left and right front side frames 24 and 25 extend from a lower portion 81 (FIG. 2) of the front 12 of the vehicle 11 toward the rear of the vehicle 11 (the direction of arrow a3) to a lower portion 83 (FIG. 2) of the front pillar 23; the upper members 26 and 27 extend from the lower portion 81 to a central portion 84 of the front pillar 23 outwardly of the front side frames 24 and 25 (the direction of arrow a1); upper front ends 87 of the upper members 26 and 27 are coupled to front-frame front ends 86 of the front side frames 24 and 25 by the frame connecting members 46 and 47; the impact absorbing mechanisms 21 are coupled to the frame connecting members 46 and 47, respectively; and the left and right impact absorbing mechanisms 21 are coupled to the ends (beam side sections 54 and 55) of the bumper beam 14.

Figure 5:
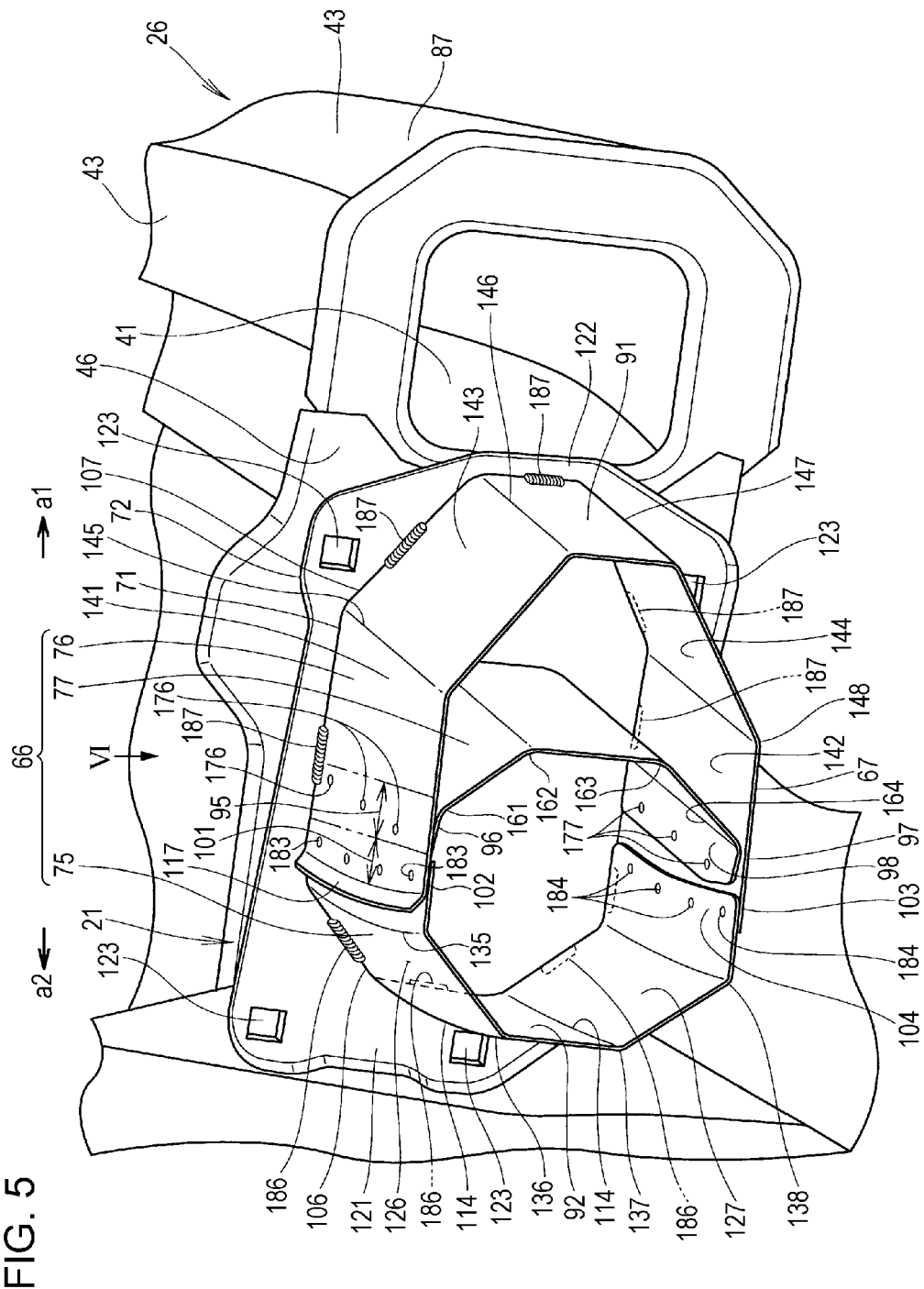
FIG. 5 is a perspective view of an internal member, external member, and partition of the impact absorbing mechanism according to the example.
Figure 6:
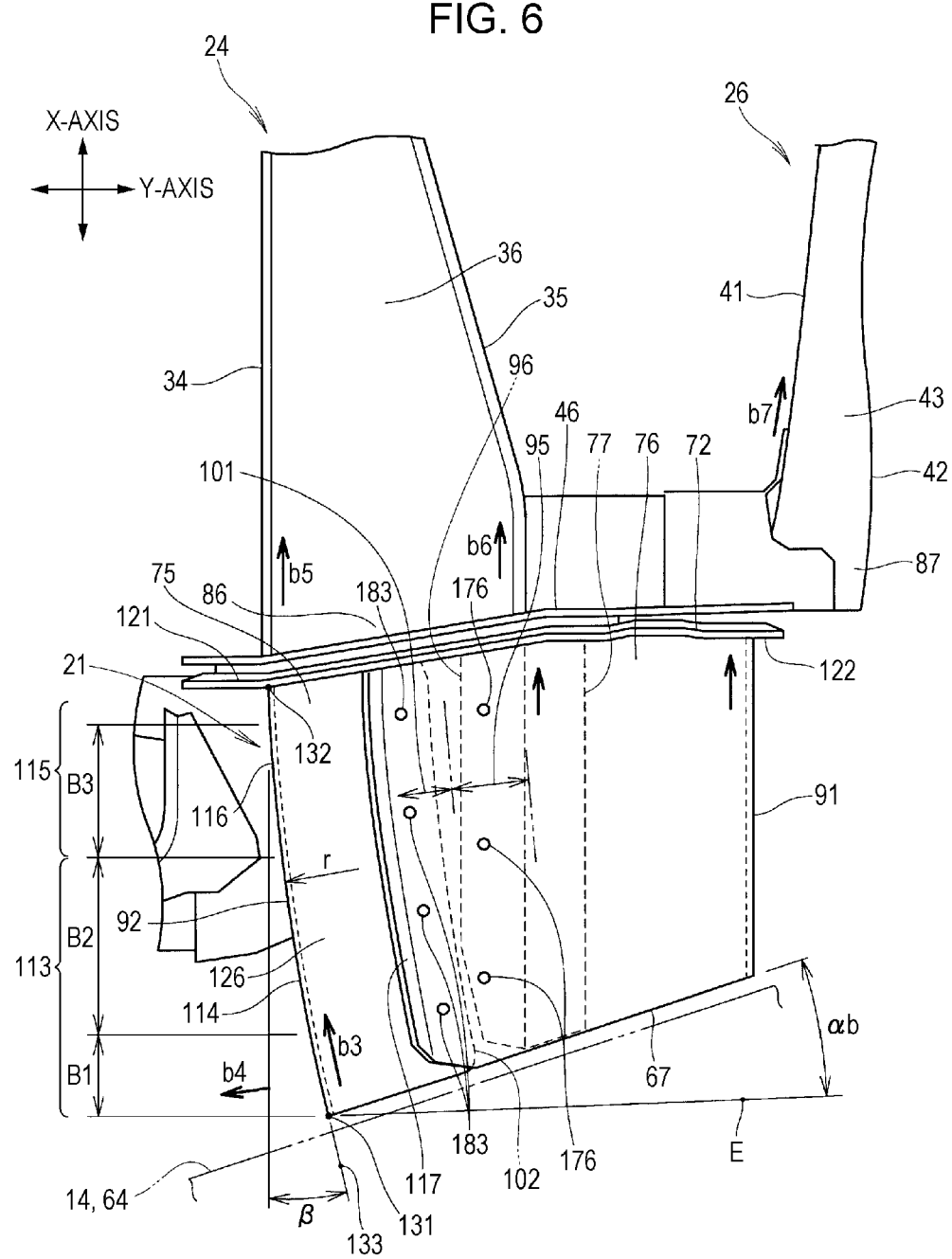
FIG. 6 is a view in the direction of arrow VI in FIG. 5 and serves an operation diagram.
Figure 7:
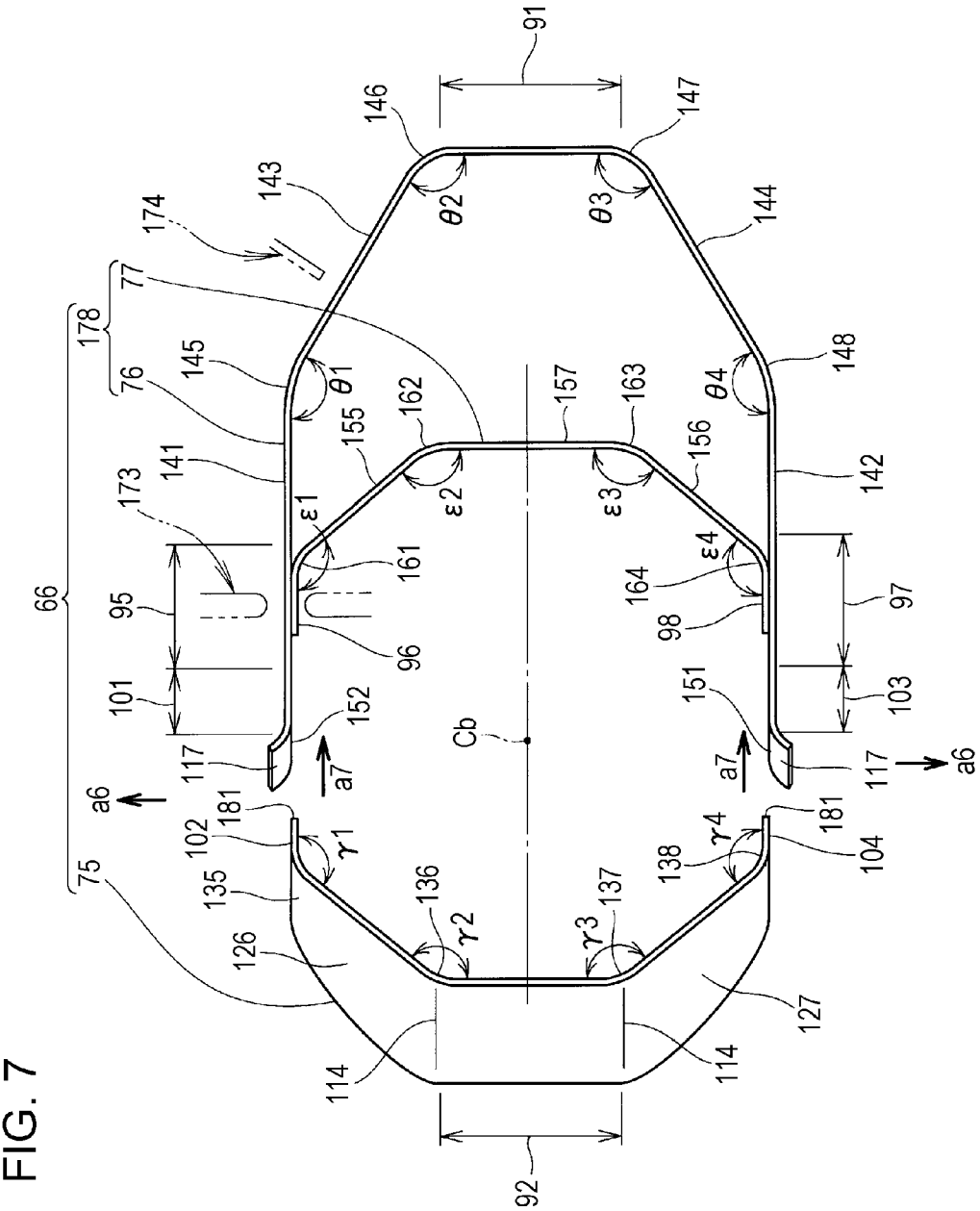
FIG. 7 illustrates how the internal member is inserted into the external member according to the example and serves as an operation diagram.

Each of the impact absorbing mechanisms 21 has a closed cross-sectional shape in frontal view of the vehicle 11 (views of FIGS. 5 and 7). In plan view of the vehicle 11 (FIG. 6), external walls 91 of the impact absorbing mechanisms 21 are substantially straight with respect to the upper internal walls 41 of the upper members 26 and 27 such that the frame connecting members 46 and 47 are disposed therebetween.

As illustrated in FIG. 6, an internal wall 92 of each of the impact absorbing mechanisms 21 has a shape in which at least a front portion 113 of the internal wall 92 from the central portion thereof in the longitudinal direction (x-axis direction) and the bumper beam 14 is obliquely bent outward.

Here, a remaining portion (rear portion) 115 is also bent.

Here, "in frontal view of the vehicle 11" means the view of FIG. 5 and the view of FIG. 7.

The impact absorbing mechanism 21 includes the internal member 75 including the internal wall 92, the external member 76 including the external wall 91, and the partition 77 disposed therebetween.

The internal walls 92 of the internal members 75 are substantially straight with respect to the front frame internal walls 34 of the front side frames 24 and 25 such that the frame connecting members 46 and 47 are disposed therebetween (FIG. 6).

The external member 76 and the partition 77 are substantially parallel with the central axis C of the vehicle 11 in the width direction (y-axis direction).

Specifically, the external wall 91 of the external member 76 and a middle wall 157 of the partition 77 are substantially straight and substantially parallel with the central axis C of the vehicle 11 in the width direction (y-axis direction) in plan view of the vehicle 11 (views of FIGS. 1 and 6).

In addition, as illustrated in FIG. 5, the external member 76 and the partition 77 are coupled together by coupling between their respective first upper coupling sections (external top central portion 95 and partition top portion 96) and coupling between their respective first lower coupling sections (external bottom central portion 97 and partition bottom portion 98).

The external member 76 and the internal member 75 are coupled together by coupling between their respective second upper coupling sections (external top end 101 and internal top portion 102) and coupling between their respective second lower coupling sections (external bottom end 103 and internal bottom portion 104) in the vicinity of the first upper coupling sections 95 and 96 and the first lower coupling sections 97 and 98, respectively.

The first upper coupling sections 95 and 96 and the first lower coupling sections 97 and 98 are arranged outwardly of the second upper coupling sections 101 and 102 and the second lower coupling sections 103 and 104.

For the impact absorbing mechanism 21, the internal member 75 includes an edge 106, the external member 76 includes an edge 107, and the edges 106 and 107 are coupled to the coupling rear wall 72 coupled to each of the frame connecting members 46 and 47 by applying fillet welding on the edges 106 and 107 and the coupling rear wall 72 being in contact with each other. The details are described below.

As illustrated in FIGS. 5 and 7, the external member 76 has a plurality of ridge sections 145 to 148, and the internal member 75 has a plurality of ridge sections 135 to 138. The ridge sections 145 to 148 and 135 to 138 are formed by bending of the external member 76 and the internal member 75 at an obtuse angle so as to form a polygonal shape having a substantially U shape in frontal view of the vehicle 11. The details are described below.

As illustrated in FIGS. 5 and 6, the ridge sections 135 to 138 of the internal member 75 have a shape in which at least a front ridge section 114 of the front portion 113 of the internal wall 92 is obliquely bent outward.

Here, a rear ridge section 116 of the remaining of the internal wall 92 (remaining portion 115) is bent.

The external member 76 includes a guiding end 117 continuous with each of the first upper coupling section (external top central portion) 95 and the first lower coupling section (external bottom central portion) 97. The guiding end 117 is bent in a direction away from the internal member 75.

Next, the front vehicle body structure is described in detail.

As previously described, for the front vehicle body structure, the coupling rear wall 72 is placed on each of the frame connecting members 46 and 47 and coupled thereto, and the impact absorbing mechanism 21 includes the coupling rear wall 72, the connecting front wall 68, and the shock-absorbing member 66 (including the internal member 75, the external member 76, and the partition (middle member) 77).

As illustrated in FIGS. 4 to 6, the coupling rear wall 72 is plate-like in shape and includes a first end 121 projecting inwardly of the front frame internal wall 34 of the front side frame 24 in the vehicle 11. The coupling rear wall 72 also includes a second end 122 overlapping the upper internal wall 41 of the upper member 26 when being viewed from the front 12 of the vehicle 11. Therefore, an impact from the front of the vehicle can be reliably conveyed to the upper internal wall 41, and weight reduction can also be achieved.

Projections 123 at the first end 121 and the second end 122 of the coupling rear wall 72 are mounted on the frame connecting member 46 by a weld section of spot welding.

The internal member 75 is mounted on the first end 121.

As illustrated in FIGS. 5 and 7, the internal member 75 has a cross section having a substantially U shape and is opened outward (the direction of arrow a1). In frontal view of the vehicle 11 (view of FIG. 7), the upper portion and the lower portion are substantially symmetric with respect to the center line Cb.

The internal top portion 102 and the internal bottom portion 104, which is substantially parallel with the internal top portion 102, form the opening of the internal member 75. The internal member 75 includes an internal upper inclined wall 126 continuous with the internal top portion 102 and an internal lower inclined wall 127 continuous with the internal bottom portion 104.

The internal upper inclined wall 126 and the internal lower inclined wall 127 are continuous with the internal wall 92.

The internal wall 92 is of an arc shape having the radius r in plan view (view of FIG. 6). The center of the circle having the radius r is positioned in an external portion of the vehicle 11. A line 133 passing through a starting point 131 and an ending point 132 for the arc is tilted by a tilt angle β with respect to the center C of the vehicle 11 toward outside the vehicle 11.

The internal upper inclined wall 126 and the internal lower inclined wall 127 are formed in a substantially arc shape that follows the internal wall 92.

As illustrated in FIGS. 5 and 7, the internal member 75 includes the four ridge sections: the first internal ridge section 135, second internal ridge section 136, third internal ridge section 137, and fourth internal ridge section 138.

The first internal ridge section 135 is an angled section that forms an interior angle γ1 defined by the internal top portion 102 and the internal upper inclined wall 126. The interior angle γ1 is an obtuse angle and can be approximately 140°, for example.

The second internal ridge section 136 is an angled section that forms an interior angle γ2 defined by the internal upper inclined wall 126 and the internal wall 92. The interior angle γ2 is an obtuse angle and can be approximately 135°, for example.

The second internal ridge section 136 is a portion in which the front ridge section 114 is continuous with the rear ridge section 116.

The third internal ridge section 137 is an angled section that forms an interior angle γ3 (γ3=γ2) defined by the internal wall 92 and the internal lower inclined wall 127.

The third internal ridge section 137 is a portion in which the front ridge section 114 is continuous with the rear ridge section 116.

The fourth internal ridge section 138 is an angled section that forms an interior angle γ4 (γ4=γ1) defined by the internal lower inclined wall 127 and the internal bottom portion 104.

The external member 76 externally overlaps the internal bottom portion 104 and the internal top portion 102 of the internal member 75 described above.

The external member 76 has a cross section having a substantially U shape and is opened toward the inside of the vehicle 11. In frontal view of the vehicle 11 (view of FIG. 7), the upper portion and the lower portion are substantially symmetric with respect to the center line Cb.

The external member 76 includes an external top portion 141 and an external bottom portion 142 substantially parallel therewith. The external top portion 141 and the external bottom portion 142 form the opening of the external member 76. The external member 76 includes an external upper inclined wall 143 continuous with the external top portion 141 and an external lower inclined wall 144 continuous with the external bottom portion 142.

The external upper inclined wall 143 and the external lower inclined wall 144 are continuous with the external wall 91.

The external wall 91 is substantially straight and substantially parallel with the central axis C in the vehicle 11 of the vehicle 11 in the width direction in plan view of the vehicle 11 (view of FIG. 6).

"Substantially straight" is a shape similar to a flat plate in other words.

The external upper inclined wall 143 and the external lower inclined wall 144 are substantially straight so as to follow the external wall 91, which is substantially straight.

As illustrated in FIGS. 5 and 7, the external member 76 includes the four ridge sections: the first external ridge section 145, second external ridge section 146, third external ridge section 147, and fourth external ridge section 148.

The first external ridge section 145 is an angled section that forms an interior angle θ1 defined by the external top portion 141 and the external upper inclined wall 143. The interior angle θ1 is an obtuse angle and can be approximately 145°, for example.

The second external ridge section 146 is an angled section that forms an interior angle θ2 defined by the external upper inclined wall 143 and the external wall 91. The interior angle θ2 is an obtuse angle and can be approximately 125°, for example.

The third external ridge section 147 is an angled section that forms an interior angle θ3 (θ3=θ2) defined by the external wall 91 and the external lower inclined wall 144.

The fourth external ridge section 148 is an angled section that forms an interior angle θ4 (θ4=θ1) defined by the external lower inclined wall 144 and the external bottom portion 142.

The external bottom portion 142 includes a different ridge section (external bottom ridge section) 151 bent outward (in the direction of arrow a6) from the leading end adjacent to the opening to the region adjacent to the leading end so as to expand the opening and the guiding end 117 continuous with the different ridge section (external bottom ridge section) 151.

The external top portion 141 also includes a different ridge section (external top ridge section) 152 and the guiding end 117, similar to (symmetric with) the external bottom portion 142.

The external bottom portion 142 includes the external bottom end 103 to be welded, and the external bottom end 103 is continuous with the different ridge section (external bottom ridge section) 151.

The external top portion 141 also includes the external top end 101 to be welded, and the external top end 101 is continuous with the different ridge section (external top ridge section) 152.

The partition (middle member) 77 is welded to the inner section of the external member 76 described above.

The partition 77 has a cross section that has a substantially U shape and is opened toward the inside of the vehicle 11. In frontal view of the vehicle 11 (view of FIG. 7), the upper portion and the lower portion are substantially symmetric with respect to the center line Cb.

The partition top portion 96 and the partition bottom portion 98, which is substantially parallel with the partition top portion 96, form the opening of the partition 77, the partition top portion 96 is continuous with a partition upper inclined wall 155, and the partition bottom portion 98 is continuous with a partition lower inclined wall 156.

The partition upper inclined wall 155 and the partition lower inclined wall 156 are continuous with the middle wall 157.

The middle wall 157 is substantially straight and substantially parallel with the central axis C of the vehicle 11 in the width direction in plan view of the vehicle 11 (view of FIG. 6).

The partition upper inclined wall 155 and the partition lower inclined wall 156 are substantially straight so as to follow the substantially straight middle wall 157.

As illustrated in FIGS. 5 and 7, the partition 77 includes four ridge sections: a first partition ridge section 161, second partition ridge section 162, third partition ridge section 163, and fourth partition ridge section 164.

The first partition ridge section 161 is an angled section that forms an interior angle $\epsilon 1$ defined by the partition top portion 96 and the partition upper inclined wall 155. The interior angle $\epsilon 1$ is an obtuse angle and can be approximately 132°, for example.

The second partition ridge section 162 is an angled section that forms an interior angle $\epsilon 2$ defined by the partition upper inclined wall 155 and the middle wall 157. The interior angle $\epsilon 2$ is an obtuse angle and can be approximately 140°, for example.

The third partition ridge section 163 is an angled section that forms an interior angle $\epsilon 3$ ($\epsilon 3 = \epsilon 2$) defined by the middle wall 157 and the partition lower inclined wall 156.

The fourth partition ridge section 164 is an angled section that forms an interior angle $\epsilon 4$ ($\epsilon 4 = \epsilon 1$) defined by the partition lower inclined wall 156 and the partition bottom portion 98.

The partition bottom portion 98 is coupled to the external bottom central portion 97 of the external member 76 by overlap welding, and the partition top portion 96 is coupled to the external top central portion 95 of the external member 76 by overlap welding, thus fixing the partition 77 to the external member 76.

The connecting front wall 68 is engaged with the external member 76 and the internal member 75.

As illustrated in FIG. 4, the connecting front wall 68 includes a main body 167 matching with the closed cross-sectional shape of the shock-absorbing member 66 (see FIG. 5), and the main body 167 includes a shallow edge 168 having the height at which it overlaps the outer surface of each of the external member 76 and the internal member 75 and is engaged therewith. The main body 167 has internal thread portions 171 for allowing the bolts 61 to pass therethrough.

Next, how the impact absorbing mechanism 21 is assembled is briefly described with reference to FIGS. 5 to 7.

The description of an assembly device for use in assembling (including a positioning mechanism and constrained mechanism), a spot welding device 173, and a metal inert gas (MIG) welding device 174 is omitted.

First, as illustrated in FIG. 7, the partition (middle member) 77 is assembled and fixed to the external member 76.

The partition (middle member) 77 is inserted inside the external member 76, and the external top central portion 95 is placed on the partition top portion 96. Simultaneously, the external bottom central portion 97 is placed on the partition bottom portion 98.

Then, the placed two sections are coupled together by weld sections 176 and 177 (see FIG. 5) including nuggets formed by spot welding. In this way, a split tubular member 178 being one of the two divisions of the shock-absorbing member 66 is completed.

Then, the internal member 75 is assembled and fixed to the split tubular member 178.

The internal member 75 is moved toward the external member 76 along arrow a7, the internal member 75 is fit in the external member 76, the internal top portion 102 is placed on the external top end 101, and the external bottom end 103 is placed on the internal bottom portion 104.

At this time, when a leading end 181 adjacent to the opening of the internal member 75 is made to come into contact with the external member 76, the leading end 181 is slid on the guiding end 117 and is guided inside the external member 76.

Subsequently, these two placed sections are coupled together by weld sections 183 and 184 including nuggets formed by spot welding. In this way, the shock-absorbing member 66 is completed.

The connecting front wall 68 is engaged with the shock-absorbing member 66, and the edge 168 of the connecting front wall 68 is coupled by welding. Any welding specifications can be used.

Lastly, the shock-absorbing member 66 is coupled to the coupling rear wall 72 (FIG. 5).

The rear edge 71 of the shock-absorbing member 66 is made to come into contact with the coupling rear wall 72, the internal member 75 is coupled to the coupling rear wall 72 by weld sections (including beads) 186 formed by application of fillet welding using MIG welding on the corners formed on the edge 106 of the internal member 75 and the coupling rear wall 72 being in contact with each other.

Similarly, the external member 76 is coupled to the coupling rear wall 72 by weld sections (including beads) 187 formed by application of fillet welding using MIG welding on the corners formed on the edge 107 of the external member 76 and the coupling rear wall 72 being in contact with each other. In this way, assembling the impact absorbing mechanism 21 is completed.

Next, operations of the front vehicle body structure according to the example are described.

In this way, for the front vehicle body structure, when the edge 181 of the opening of the internal member 75 (edge of the internal top portion 102 and edge of the internal bottom portion 104) comes into contact with the guiding end 117 of the external member 76 in fitting the internal member 75 in the external member 76, the internal top portion 102 and the internal bottom portion 104 move in contact with the guiding end 117 and are positioned. Thus, an assembly operation of inserting the internal member 75 into the external member 76 can be facilitated.

Next, the mechanism for absorbing an impact of the front vehicle body structure is described with reference to FIGS. 8 and 9.

Figure 9:
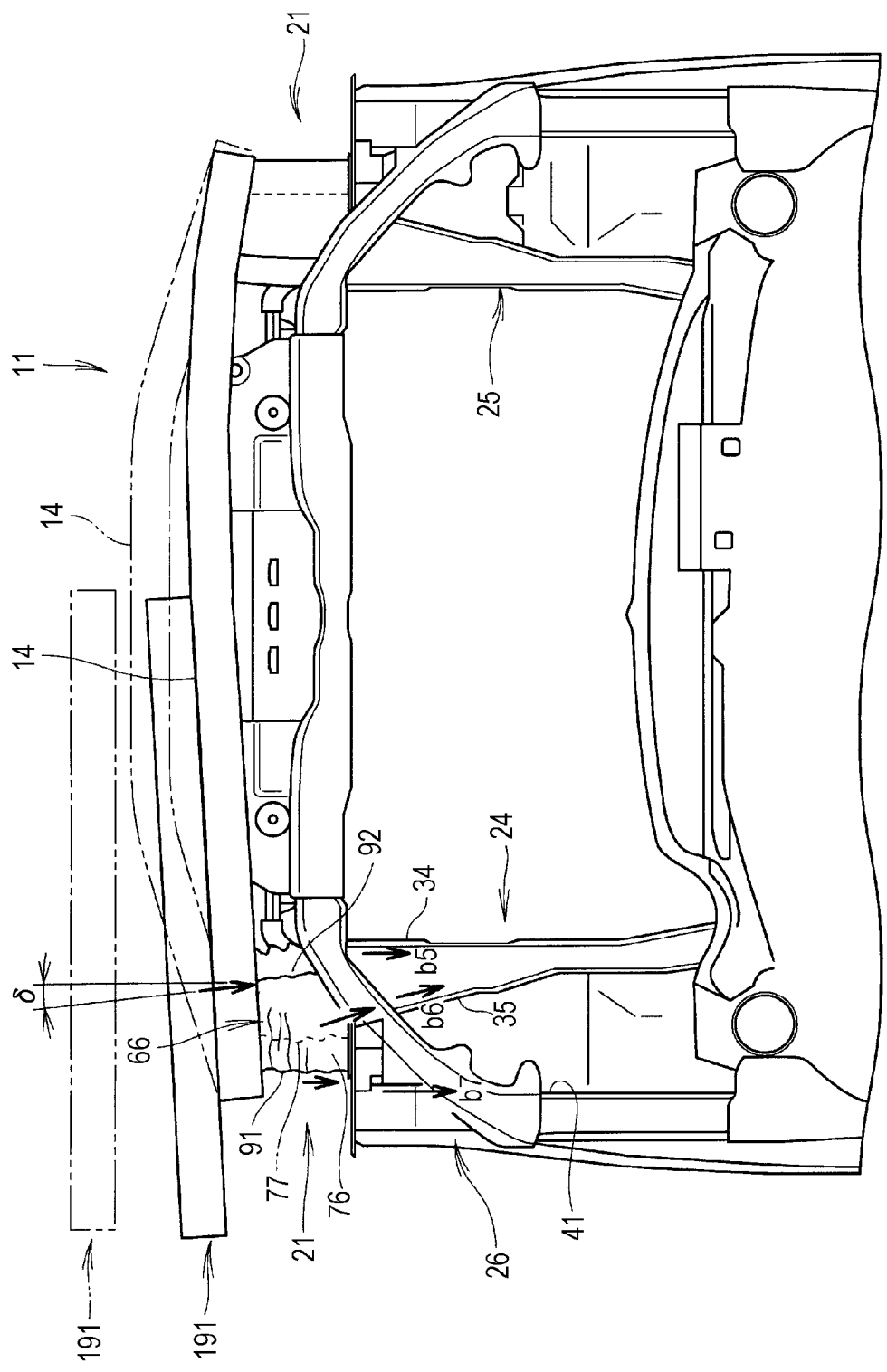
FIG. 9 is an illustration for describing working continued from FIG. 8.

For the front vehicle body structure, when an offset collision occurs in the left of the front 12 of the vehicle 11, the impact (load) is conveyed to the impact absorbing mechanism 21, and the impact is absorbed by the steel-sheet shock-absorbing member 66 being compressively deformed (FIG. 9).

Here, as illustrated in FIG. 6, the amount of compressive deformation of the shock-absorbing member 66 is set in three stages. The amount (range) of deformation to the distance B1 is an initial compressive deformation range. The amount (range) of deformation to the distance B2 is a middle compressive deformation range. The amount (range) of deformation to the distance B3 is a late compressive deformation range.

"Middle compressive deformation" indicates deformation that exceeds the distance B1 and is not greater than B1+B2.

"Middle load" indicates load (impact) that causes middle compressive deformation.

Specifically, when an offset collision occurs between the vehicle 11 and an object (e.g., a vehicle) 191, the impact (load) is input to the bumper beam 14 as indicated by arrow b1. The bumper beam 14 conveys the load to the left impact absorbing mechanism 21 while causing the right impact absorbing mechanism 21 to pivot about the pivot point P as indicated by arrow b2. The left impact absorbing mechanism 21 starts undergoing an initial deformation (in the range of the distance B1).

The load is conveyed from the pivoting bumper beam 14 to the internal wall 92 inclined and bent outward as indicated by arrow b3. Thus, the load is conveyed to the internal wall 92 substantially in parallel.

As a result, bending moment of the shock-absorbing member 66 toward the inside of the vehicle 11 (direction of arrow b4) can be reduced, in comparison with when the internal wall 92 would not be inclined and bent (would be parallel with the central axis C).

In this way, because the bending moment occurring in the shock-absorbing member 66 can be reduced, as illustrated in FIG. 9, intermediate folding of the shock-absorbing member 66 with respect to an input angle δ of a middle load, in other words, the load corresponding to middle deformation (in the range of the distance B2) can be avoided, and crushing (compressive) deformation of the impact absorbing mechanism 21 can be stabilized. Therefore, the impact absorbing mechanism 21 can reliably absorb an impact.

Figure 8:
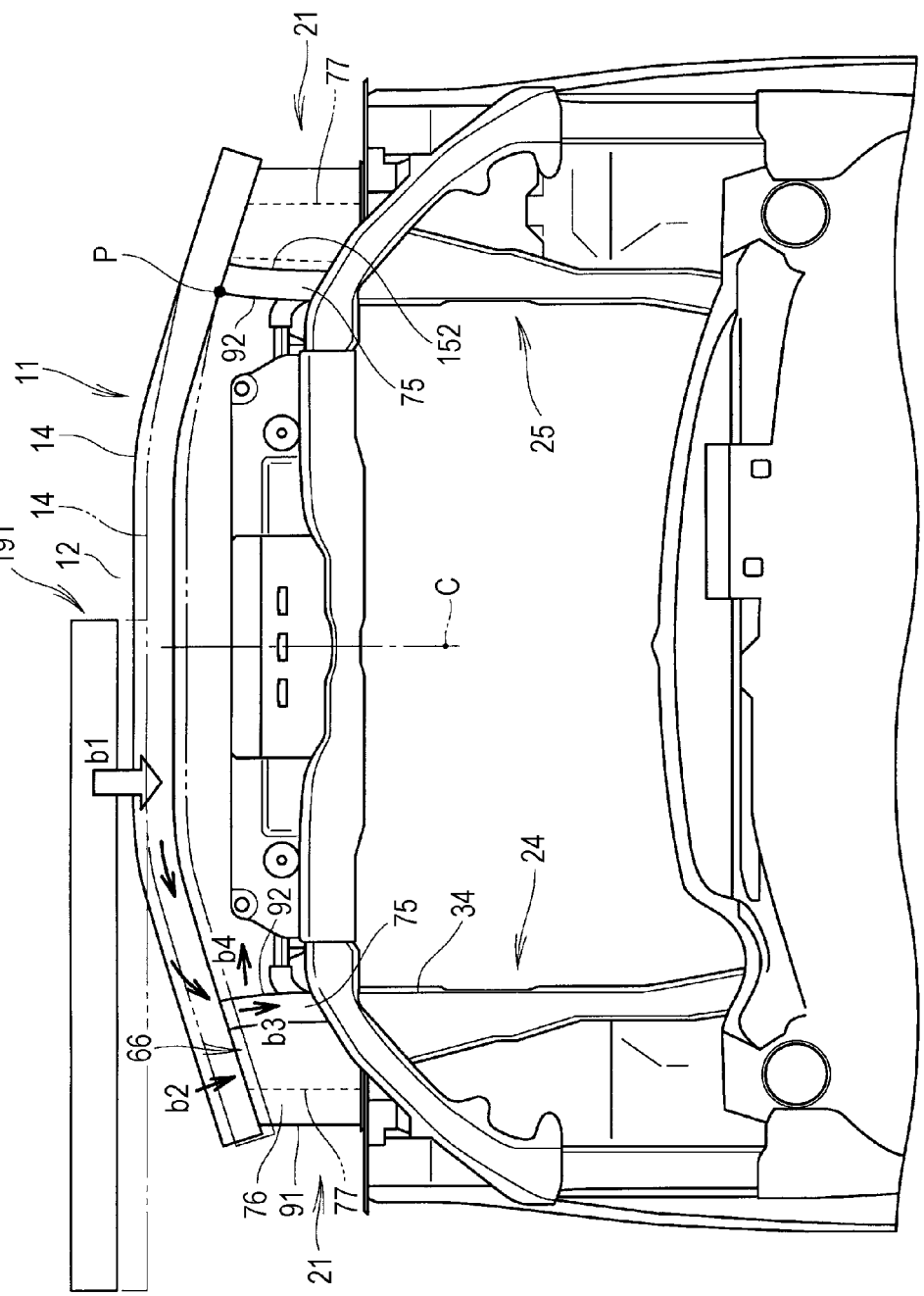
FIG. 8 illustrates how the mechanism for absorbing an impact in the front vehicle body structure according to the example works.

"Intermediate folding" indicates a phenomenon in which the internal wall 92 is bent and folded as a valley fold (in front of itself) at the border between the distances B2 and B3 illustrated in FIG. 6, at a point adjacent to that border, or at the border between the front portion 113 of the internal member 75 and the remaining portion 115, and the shock-absorbing member 66 collapses (in the direction of arrow b4 in FIG. 8).

A left offset collision is described above as an example of front collisions of the vehicle 11. Similar operations and advantages are also obtainable for a right offset collision.

For the impact absorbing mechanism 21, in a middle range (range of the distance B2) in the course of compressive deformation, a load from the internal wall 92, which is substantially straight with respect to the front frame internal wall 34, of the internal member 75 of the impact absorbing mechanism 21 is transmitted to the front side frame 24, in particular, to the front frame internal wall 34 in a substantially straight manner as indicated by arrow b5 (see also FIGS. 3 and 6).

A load from the compressively deformed partition (medium member) 77, which is substantially straight with respect to the front frame external wall 35, is transmitted to the front side frame 24, in particular, to the front frame external wall 35 in a substantially straight manner as indicated by arrow b6 (see also FIGS. 3 and 6).

A load from the compressively deformed external member 76, which is substantially straight with respect to the upper internal wall 41, is transmitted to the upper member 26, in particular, to the upper internal wall 41 in a substantially straight manner as indicated by arrow b7 (see also FIGS. 3 and 6).

As a result, (the shock-absorbing member 66 of) the impact absorbing mechanism 21 can be sufficiently compressively deformed without being folded at a point in the longitudinal direction (x-axis direction) (at the border between the distances B2 and B3 or at the border between the front portion 113 of the internal member 75 and the remaining portion 115), and its impact absorbing performance can be improved.

When a left offset collision occurs, the bumper beam 14 starts pivoting about the internal member 75 of the right impact absorbing mechanism 21 as the pivot (pivot point) P. Because the pivot point P is near to the bent section (different ridge section (external bottom ridge section) 151 and different ridge section (external top ridge section) 152) for use in forming the guiding end 117, a force (bending moment) that causes the shock-absorbing member 66 of the impact absorbing mechanism 21 to undergo intermediate folding occurring in the impact absorbing mechanism 21 can be reduced.

The front vehicle body structure according to the embodiment of the present invention applied to a front body of a vehicle can also be applied to a rear body of a vehicle.

The front vehicle body structure according to the embodiment of the present invention is suited for an automobile.

According to the embodiment of the present invention, a front vehicle body structure includes, on each of left and right sides, a front side frame that extends from a lower front of a vehicle toward a rear of the vehicle to a lower portion of a front pillar, an upper member that extends from the lower front to a central portion of the front pillar outwardly of the front side frame, a frame connecting member that couples an upper front end of the upper member to a front-frame front end of the front side frame, and an impact absorbing mechanism coupled to the frame connecting member and coupled to an end of a bumper beam. The impact absorbing mechanism has a closed cross-sectional shape in frontal view of the vehicle. The impact absorbing mechanism includes an external wall and an internal wall. The external wall is substantially straight with respect to an upper internal wall of the upper member such that the frame connecting member is disposed therebetween. The internal wall has a shape in which at least a front portion of the internal wall between a central portion of the internal wall in its longitudinal direction and the bumper beam is obliquely bent outward.

Accordingly, for example, if an offset collision occurs in the left front of the vehicle and the impact (load) caused by the offset collision is input, the bumper beam starts pivoting toward the inside of the vehicle about the right impact absorbing mechanism as a pivot and the load is conveyed substantially in parallel with the internal wall of the left impact absorbing mechanism bent outward. As a result, bending moment occurring in the impact absorbing mechanism in an initial term in the course of deformation of the impact absorbing mechanism caused by the offset collision can be reduced, intermediate folding (bending and folding in the middle while collapsing) for an input angle of the load in a middle term can be avoided, and crushing (compressive) deformation of the impact absorbing mechanism can be stabilized. Therefore, the impact absorbing mechanism can reliably absorb an impact.

According to the embodiment of the present invention, the impact absorbing mechanism may include an internal member including the internal wall, an external member including the external wall, and a partition between the internal member and the external member. The internal wall of the internal member may be substantially straight with respect to a front frame internal wall of the front side frame such that the frame connecting member is disposed therebetween. The external member and the partition may be substantially parallel with a central axis of the vehicle in its width direction.

Accordingly, in a middle term in the course of deformation of the impact absorbing mechanism caused by the impact (load) occurring in the left offset collision, the load is transmitted from the internal wall of the internal member of the impact absorbing mechanism to the front frame internal wall of the front side frame.

The load is transmitted from the partition and the external member to the front frame external wall of the front side frame and the upper internal wall of the upper member.

As a result, the impact absorbing mechanism can be sufficiently compressively deformed without being folded in the middle in the longitudinal direction, and its impact absorbing performance can be improved.

According to the embodiment of the present invention, each of the external member and the partition may include a first upper coupling section and a first lower coupling section, and each of the external member and the internal member may include a second upper coupling section and a second lower coupling section. The first upper coupling section and the first lower coupling section may be near to the second upper coupling section and the second lower coupling section, respectively. The external member and the partition may be coupled by coupling between the first upper coupling sections and coupling between the first lower coupling sections. The external member and the internal member may be coupled by coupling between the second upper coupling sections and coupling between the second lower coupling sections.

Accordingly, the first upper coupling sections can be composed of two layers. Similarly, each of the first lower coupling sections, the second upper coupling sections, and the second lower coupling sections can be composed of two layers.

As a result, the first upper coupling sections, the first lower coupling sections, the second upper coupling sections, and the second lower coupling sections can have approximately the same strength, and the three plate members (internal member, external member, and partition) can be set to approximately the same strength.

Therefore, in response to an impact (load) occurring in an offset collision, the three plate members (internal member, external member, and partition) can be compressively deformed approximately uniformly.

According to the embodiment of the present invention, the first upper coupling sections and the first lower coupling sections may be positioned outwardly of the second upper coupling sections and the second lower coupling sections.

Accordingly, after placing of the first upper coupling section of the partition on that of the external member, coupling of them, placing of the first lower coupling section of the partition on that of the external member, and coupling of them, the second upper coupling section of the internal member can be coupled to that of the external member and the second lower coupling section of the internal member can be coupled to that of the external member. Thus, coupling the three plate members (internal member, external member, and partition) can be facilitated.

Also, coupling the three plate members (internal member, external member, and partition) in this manner enables the internal member, external member, and partition to be made by bending (deformation processing) on a steel sheet.

According to the embodiment of the present invention, the impact absorbing mechanism may further include a coupling rear wall coupled to the frame connecting member, and the coupling rear wall and edges of the internal member and the external member may be coupled by fillet welding applied on the edges and the coupling rear wall being in contact with each other.

Accordingly, an impact (load) occurring in an offset collision is directly conveyed from the edges to the coupling rear wall, is not easily conveyed to a bead formed by fillet welding, and breakage of a weld section containing the bead does not easily occur. As a result, the internal member, external member, and partition start crushing (being compressively deformed) from an initial term of the offset collision. That is, performance of absorbing an impact can be improved.

According to the embodiment of the present invention, each of the external member and the internal member may further include a plurality of ridge sections bent at an obtuse angle to form a polygonal shape having a substantially U shape in frontal view of the vehicle. The ridge sections of the internal member have a shape in which at least a front ridge section in a front portion of the internal wall may be obliquely bent outward.

Accordingly, only the front portion of the internal wall can be obliquely bent outward using a steel sheet.

According to the embodiment of the present invention, the external member may further include a guiding end, and the guiding end may be continuous with each of the first upper coupling section and the first lower coupling section and be bent in a direction away from the internal member.

Accordingly, because the second upper coupling section and the second lower coupling section of the external member previously coupled to the partition are placed on and coupled to the second upper coupling section and the second lower coupling section of the internal member, respectively, in fitting the internal member, the guiding end guides the incoming internal member while being in contact with the second upper coupling section and the second lower coupling section of the internal member. Therefore, inserting the internal member can be facilitated.

The bending for forming the guiding end forms a different ridge section, this increases the number of ridge sections, and the impact range where an impact can be absorbed can be extended.

In particular, for example, when a left offset collision occurs, the bumper beam starts pivoting about the internal member of the right impact absorbing mechanism as a pivot, because the pivot is near to the bending (different ridge section) for forming the guiding end, a force that occurs in the impact absorbing mechanism and causes the impact absorbing mechanism to be folded in the middle (bending moment) can be reduced.

Obviously, numerous modifications and variations of the present invention are possible in light of the above teachings. It is therefore to be understood that within the scope of the appended claims, the invention may be practiced otherwise than as specifically described herein.

What is claimed is:
1. A front vehicle body structure comprising, on each of left and right sides:
   a front side frame that extends toward a rear of a vehicle from a lower front of the vehicle to a lower portion of a front pillar;
   an upper member that extends from the lower front to a central portion of the front pillar outwardly with respect to the front side frame;
   a frame connecting member that couples an upper front end of the upper member to a front-frame front end of the front side frame; and an impact absorbing mechanism coupled to the frame connecting member and coupled to an end of a bumper beam, wherein the impact absorbing mechanism has a closed cross-sectional shape in frontal view of the vehicle, the impact absorbing mechanism includes an external wall and an internal wall, the external wall is substantially straight with respect to an upper internal wall of the upper member such that the frame connecting member is disposed therebetween, the internal wall has a shape in which at least a front portion of the internal wall between a central portion of the internal wall in its longitudinal direction and the bumper beam is obliquely bent outward, the impact absorbing mechanism includes an internal member including the internal wall, an external member including the external wall, and a partition between the internal member and the external member, the internal wall of the internal member is substantially straight with respect to a front frame internal wall of the front side frame such that the frame connecting member is disposed therebetween, and the external member and the partition are substantially parallel with a central axis of the vehicle in its width direction.

2. The front vehicle body structure according to claim 1, wherein each of the external member and the partition includes a first upper coupling section and a first lower coupling section, each of the external member and the internal member includes a second upper coupling section and a second lower coupling section, the first upper coupling section and the first lower coupling section are near to the second upper coupling section and the second lower coupling section, respectively, the external member and the partition are coupled by coupling between the first upper coupling sections and coupling between the first lower coupling sections, and the external member and the internal member are coupled by coupling between the second upper coupling sections and coupling between the second lower coupling sections.

3. The front vehicle body structure according to claim 2, wherein the first upper coupling sections and the first lower coupling sections are positioned outwardly of the second upper coupling sections and the second lower coupling sections.

4. The front vehicle body structure according to claim 1, wherein the impact absorbing mechanism further includes a coupling rear wall coupled to the frame connecting member, the coupling rear wall and edges of the internal member and the external member are coupled by fillet welding applied on the edges and the coupling rear wall being in contact with each other.

5. The front vehicle body structure according to claim 1, wherein each of the external member and the internal member further includes a plurality of ridge sections bent at an obtuse angle to form a polygonal shape having a substantially U shape in frontal view of the vehicle, and the ridge sections of the internal member have a shape in which at least a front ridge section in a front portion of the internal wall is obliquely bent outward.

6. The front vehicle body structure according to claim 3, wherein the external member further includes a guiding end, and the guiding end is continuous with each of the first upper coupling section and the first lower coupling section and is bent in a direction away from the internal member.

7. The front vehicle body structure according to claim 4, the coupling rear wall is plate-like in shape and includes a first end projecting inwardly of the front frame internal wall of the front side frame and a second end overlapping the upper internal wall of the upper member in frontal view of the vehicle.

* * * * *